United States Patent
Gafni et al.

(10) Patent No.: US 9,985,910 B2
(45) Date of Patent: May 29, 2018

(54) ADAPTIVE FLOW PRIORITIZATION

(71) Applicant: Mellanox Technologies TLV Ltd., Raanana (IL)

(72) Inventors: Barak Gafni, Campbell, CA (US); Benny Koren, Zichron Yaakov (IL); George Elias, Tel Aviv (IL); Itamar Rabenstein, Petah Tikva (IL); Eyal Srebro, Akko (IL); Sagi Kuks, Ramat Gan (IL); Niv Aibester, Herzliya (IL)

(73) Assignee: Mellanox Technologies TLV Ltd., Raanana (IL)

( * ) Notice: Subject to any disclaimer, the term of this patent is extended or adjusted under 35 U.S.C. 154(b) by 138 days.

(21) Appl. No.: 15/194,585

(22) Filed: Jun. 28, 2016

(65) Prior Publication Data

US 2017/0373989 A1 Dec. 28, 2017

(51) Int. Cl.
*H04L 12/947* (2013.01)
*H04L 12/863* (2013.01)
*H04L 12/851* (2013.01)
*H04L 12/801* (2013.01)

(52) U.S. Cl.
CPC .............. *H04L 49/25* (2013.01); *H04L 47/12* (2013.01); *H04L 47/24* (2013.01); *H04L 47/6295* (2013.01)

(58) Field of Classification Search
None
See application file for complete search history.

(56) References Cited

U.S. PATENT DOCUMENTS

| 6,108,713 A | 8/2000 | Sambamurthy et al. |
| 6,178,448 B1 | 1/2001 | Gray et al. |
| 6,594,263 B1 | 7/2003 | Martinsson et al. |

(Continued)

FOREIGN PATENT DOCUMENTS

| EP | 1720295 A1 | 11/2006 |
| EP | 2466476 A1 | 6/2012 |

(Continued)

OTHER PUBLICATIONS

Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.

(Continued)

*Primary Examiner* — Vinncelas Louis
(74) *Attorney, Agent, or Firm* — D. Kligler IP Services Ltd.

(57) ABSTRACT

A method for communication includes receiving and forwarding packets in multiple flows to respective egress interfaces of a switching element for transmission to a network. For each of one or more of the egress interfaces, in each of a succession of arbitration cycles, a respective number of the packets in each of the plurality of the flows that are queued for transmission through the egress interface is assessed, and the flows for which the respective number is zero are assigned to a first group, while the flows for which the respective number is non-zero are assigned to a second group. The received packets that have been forwarded to the egress interface and belong to the flows in the first group are transmitted with a higher priority than the flows in the second group.

20 Claims, 2 Drawing Sheets

(56) References Cited

U.S. PATENT DOCUMENTS

| | | | |
|---|---|---|---|
| 7,321,553 | B2 | 1/2008 | Prasad et al. |
| 7,821,939 | B2 | 10/2010 | Decusatis et al. |
| 8,078,743 | B2 | 12/2011 | Sharp et al. |
| 8,345,548 | B2 | 1/2013 | Gusat et al. |
| 8,473,693 | B1 | 6/2013 | Muppalaneni et al. |
| 8,576,715 | B2 | 11/2013 | Bloch et al. |
| 8,767,561 | B2 | 7/2014 | Gnanasekaran et al. |
| 8,879,396 | B2 | 11/2014 | Guay et al. |
| 8,989,017 | B2 | 3/2015 | Naouri |
| 8,995,265 | B2 | 3/2015 | Basso et al. |
| 9,014,006 | B2 | 4/2015 | Haramaty et al. |
| 9,325,619 | B2 | 4/2016 | Guay et al. |
| 9,356,868 | B2 | 5/2016 | Tabatabaee et al. |
| 9,426,085 | B1 | 8/2016 | Anand et al. |
| 2002/0191559 | A1 | 12/2002 | Chen et al. |
| 2003/0108010 | A1 | 6/2003 | Kim et al. |
| 2003/0223368 | A1 | 12/2003 | Allen et al. |
| 2004/0008714 | A1 | 1/2004 | Jones |
| 2005/0053077 | A1 | 3/2005 | Blanc et al. |
| 2005/0169172 | A1 | 8/2005 | Wang et al. |
| 2005/0216822 | A1* | 9/2005 | Kyusojin ............... H04L 47/10 715/205 |
| 2005/0226156 | A1 | 10/2005 | Keating et al. |
| 2006/0088036 | A1 | 4/2006 | De Prezzo |
| 2006/0092837 | A1 | 5/2006 | Kwan et al. |
| 2006/0092845 | A1 | 5/2006 | Kwan et al. |
| 2007/0104102 | A1 | 5/2007 | Opsasnick |
| 2007/0104211 | A1 | 5/2007 | Opsasnick |
| 2007/0201499 | A1 | 8/2007 | Kapoor et al. |
| 2007/0291644 | A1 | 12/2007 | Roberts et al. |
| 2008/0037420 | A1 | 2/2008 | Tang et al. |
| 2008/0175146 | A1 | 7/2008 | Van Leekwuck et al. |
| 2008/0192764 | A1* | 8/2008 | Arefi ....................... H04L 47/10 370/412 |
| 2009/0207848 | A1 | 8/2009 | Kwan et al. |
| 2010/0220742 | A1 | 9/2010 | Brewer et al. |
| 2013/0014118 | A1 | 1/2013 | Jones |
| 2013/0039178 | A1 | 2/2013 | Chen et al. |
| 2013/0250757 | A1 | 9/2013 | Tabatabaee et al. |
| 2013/0250762 | A1 | 9/2013 | Assarpour |
| 2013/0275631 | A1 | 10/2013 | Magro et al. |
| 2013/0286834 | A1 | 10/2013 | Lee |
| 2013/0305250 | A1 | 11/2013 | Durant |
| 2014/0133314 | A1 | 5/2014 | Mathews et al. |
| 2014/0269324 | A1 | 9/2014 | Tietz et al. |
| 2015/0026361 | A1 | 1/2015 | Matthews et al. |
| 2015/0124611 | A1 | 5/2015 | Attar et al. |
| 2015/0127797 | A1 | 5/2015 | Attar et al. |
| 2015/0180782 | A1 | 6/2015 | Rimmer et al. |
| 2015/0200866 | A1 | 7/2015 | Pope et al. |
| 2015/0381505 | A1 | 12/2015 | Sundararaman et al. |
| 2016/0135076 | A1 | 5/2016 | Grinshpun et al. |
| 2017/0142020 | A1 | 5/2017 | Sundararaman et al. |
| 2017/0180261 | A1 | 6/2017 | Ma et al. |
| 2017/0187641 | A1 | 6/2017 | Lundqvist et al. |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

Pfister et al., "Hot Spot Contention and Combining in Multistage Interconnect Networks", IEEE Transactions on Computers, vol. C-34, pp. 943-948, Oct. 1985.

Zhu et al.,"Congestion control for large-scale RDMA deployments", SIGCOMM'15, pp. 523-536, Aug. 17-21, 2015.

Hahne et al., "Dynamic Queue Length Thresholds for Multiple Loss Priorities", IEEE/ACM Transactions on Networking, vol. 10, No. 3, pp. 368-380, Jun. 2002.

Choudhury et al., "Dynamic Queue Length Thresholds for Shared-Memory Packet Switches", IEEE/ACM Transactions Networking, vol. 6, Issue 2 , pp. 130-140, Apr. 1998.

Gafni et al., U.S. Appl. No. 14/672,357, filed Mar. 30, 3015.

Ramakrishnan et al., "The Addition of Explicit Congestion Notification (ECN) to IP", Request for Comments 3168, Network Working Group, 63 pages, Sep. 2001.

IEEE Standard 802.1Q™-2005, "IEEE Standard for Local and metropolitan area networks Virtual Bridged Local Area Networks", 303 pages, May 19, 2006.

INFINIBAND TM Architecture, Specification vol. 1, Release 1.2.1, Chapter 12, pp. 657-716, Nov. 2007.

IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.

IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.

Elias et al., U.S. Appl. No. 14/718,114, filed May 21, 2015.
Gafni et al., U.S. Appl. No. 15/075,158, filed Mar. 20, 2016.
Shpiner et al., U.S. Appl. No. 14/967,403, filed Dec. 14, 2015.
Elias et al., U.S. Appl. No. 14/994,164, filed Jan. 13, 2016.
Aibester et al., U.S. Appl. No. 15/063,527, filed Mar. 8, 2016.
Kriss et al., U.S. Appl. No. 15/161,316, filed May 23, 2016.
Roitshtein et al., U.S. Appl. No. 14/961,923, filed Dec. 8, 2015.
Cisco Systems, Inc., "Priority Flow Control: Build Reliable Layer 2 Infrastructure", 8 pages, 2015.
Elias et al., U.S. Appl. No. 15/081,969, filed Mar. 28, 2016.
Cisco Systems, Inc.,"Advantage Series White Paper Smart Buffering", 10 pages, 2016.
Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.
U.S. Appl. No. 14/718,114 Office Action dated Sep. 16, 2016.
U.S. Appl. No. 14/672,357 Office Action dated Sep. 28, 2016.
U.S. Appl. No. 14/994,164 office action dated Jul. 5, 2017.
U.S. Appl. No. 15/075,158 office action dated Aug. 24, 2017.
U.S. Appl. No. 14/967,403 office action dated Nov. 9, 2017.
U.S. Appl. No. 15/081,969 office action dated Oct. 5, 2017.
European Application # 17172494.1 search report dated Oct. 13, 2017.
European Application # 17178355 search report dated Nov. 13, 2017.
U.S. Appl. No. 15/063,527 office action dated Feb. 8, 2018.
U.S. Appl. No. 15/161,316 office action dated Feb. 7, 2018.

* cited by examiner

ADAPTIVE FLOW PRIORITIZATION

FIELD OF THE INVENTION

The present invention relates generally to data communication networks, and particularly to prioritized forwarding of data packets in such networks.

BACKGROUND

Switching elements in modern packet communication networks commonly give priority to certain flows over others based on considerations such as differentiated quality of service (QoS) and congestion avoidance. (The term "switching elements" is used herein to refer to network elements having multiple interfaces to the network, such as network ports, through which packets are received and transmitted, and logic for directing each received packet from its ingress to its appropriate egress interface. Switches, bridges and routers are some examples of such switching elements. A "flow" is a sequence of packets transmitted through the network from a particular source to a particular destination.) In some networks, switching elements apply adaptive flow prioritization techniques, based on considerations such as the current queue lengths of different flows.

Techniques of this sort are described, for example, by Hoeiland-Joergensen et al., in "The FlowQueue-CoDel Packet Scheduler and Active Queue Management Algorithm," published by the Internet Engineering Task Force (IETF) as draft-ietf-aqm-fq-codel-06 (Mar. 18, 2016). According to the authors, the algorithm that they describe (referred to as "FQ-CoDel") is useful in fighting "bufferbloat" and reducing latency. FQ-CoDel mixes packets from multiple flows and reduces the impact of head of line blocking from bursty traffic, as well as providing isolation for low-rate traffic such as DNS, Web, and videoconferencing traffic. The algorithm is said to improve utilization across the networking fabric, especially for bidirectional traffic, by keeping queue lengths short.

Another flow prioritization technique is described in an Advantage Series White Paper entitled "Smart Buffering," published by Cisco Systems, Inc. (San Jose, Calif., 2016). According to this White Paper, Cisco Nexus® switches use packet prioritization to provide latency benefits for small flows under load by automatically giving priority to the first few packets from each flow. A threshold is used to determine the number of packets that have been seen from a flow. If the number of packets received from the flow is less than the prioritization threshold, the packets are prioritized; otherwise, they are not. This mechanism allows short flows to have priority in both the switch and the network to reduce the number of drops, which have significantly greater impact on short flows than on long-lived flows.

SUMMARY

Embodiments of the present invention that are described hereinbelow provide improved methods for forwarding packets in a network and apparatus implementing such methods.

There is therefore provided, in accordance with an embodiment of the invention, a method for communication, which includes receiving from a packet data network, via ingress interfaces of a switching element, packets belonging to multiple flows, and forwarding the packets to respective egress interfaces of the switching element for transmission to the network. For each egress interface of the switching element, the packets, belonging to a plurality of the flows, that have been forwarded for transmission through the egress interface are queued. For each of one or more of the egress interfaces, in each of a succession of arbitration cycles, a respective number of the packets in each of the plurality of the flows that are queued for transmission through the egress interface is assesses, and the flows for which the respective number is zero are assigned to a first group, while assigning the flows for which the respective number is non-zero to a second group. After assigning the flows, the received packets that have been forwarded to the egress interface and belong to the flows in the first group are transmitted to the network with a higher priority than the flows in the second group.

In a disclosed embodiment, assessing the respective number includes maintaining a respective counter for each flow among the plurality of the flows, incrementing the respective counter when a packet in the flow is queued for transmission, and decrementing the counter when the packet is transmitted to the network.

In some embodiments, the method includes initiating a new arbitration cycle in the succession in response to an arbitration event, wherein assessing the respective number includes reassessing the respective number of the packets in each of the plurality of the flows that are queued for transmission upon initiation of the new arbitration cycle, and wherein assigning the flows includes reassigning the flows to the first and second groups based on the reassessed number. Typically, the arbitration event is selected from a group of arbitration events consisting of selection of a predefined number of the queued packets for transmission and expiration of a predefined time period.

In a disclosed embodiment, transmitting the packets includes transmitting the packets that belong to the flows in the first group with a strict priority over the flows in the second group. Additionally or alternatively, transmitting the packets includes transmitting the packets within each of the first and second groups in an order in which the packets have been queued for transmission.

In one embodiment, the packets belong to multiple different traffic classes, which have different, respective levels of quality of service (QoS), and queuing the packets includes assigning the flows to different queues according to the traffic classes, and transmitting the packets includes arbitrating separately among the flows in each of one or more of the different traffic classes.

In some embodiments, the method includes receiving in the switching element an indication of congestion in the network, and in response to the indication, applying a congestion control protocol to the flows in the second group but not to the flows in the first group. In one embodiment, applying the congestion control protocol includes selecting the flows to which congestion control measures are to be applied responsively to the respective number of the packets in each of the flows in the second group that are queued for transmission.

Additionally or alternatively, the method includes making an assessment of at least one of a transmission rate and an occurrence of transmission bursts in at least some of the flows, and applying the assessment in assigning the flows to the first and second groups.

There is also provided, in accordance with an embodiment of the invention, communication apparatus, including multiple interfaces configured to serve as ingress and egress interfaces to a packet data network and to receive packets belonging to multiple flows for forwarding to respective egress interfaces for transmission to the network. Control circuitry is configured to queue the packets, belonging to a plurality of the flows, for transmission through each egress interface, and for each of one or more of the egress interfaces, in each of a succession of arbitration cycles to assess a respective number of the packets in each of the plurality of the flows that are queued for transmission through the egress interface, to assign the flows for which the respective number is zero to a first group, while assigning the flows for which the respective number is non-zero to a second group, and after assigning the flows, to transmit to the network the packets that have been forwarded to the egress interface and belong to the flows in the first group with a higher priority than the flows in the second group.

The present invention will be more fully understood from the following detailed description of the embodiments thereof, taken together with the drawings in which:

DETAILED DESCRIPTION OF EMBODIMENTS

Figure 1:
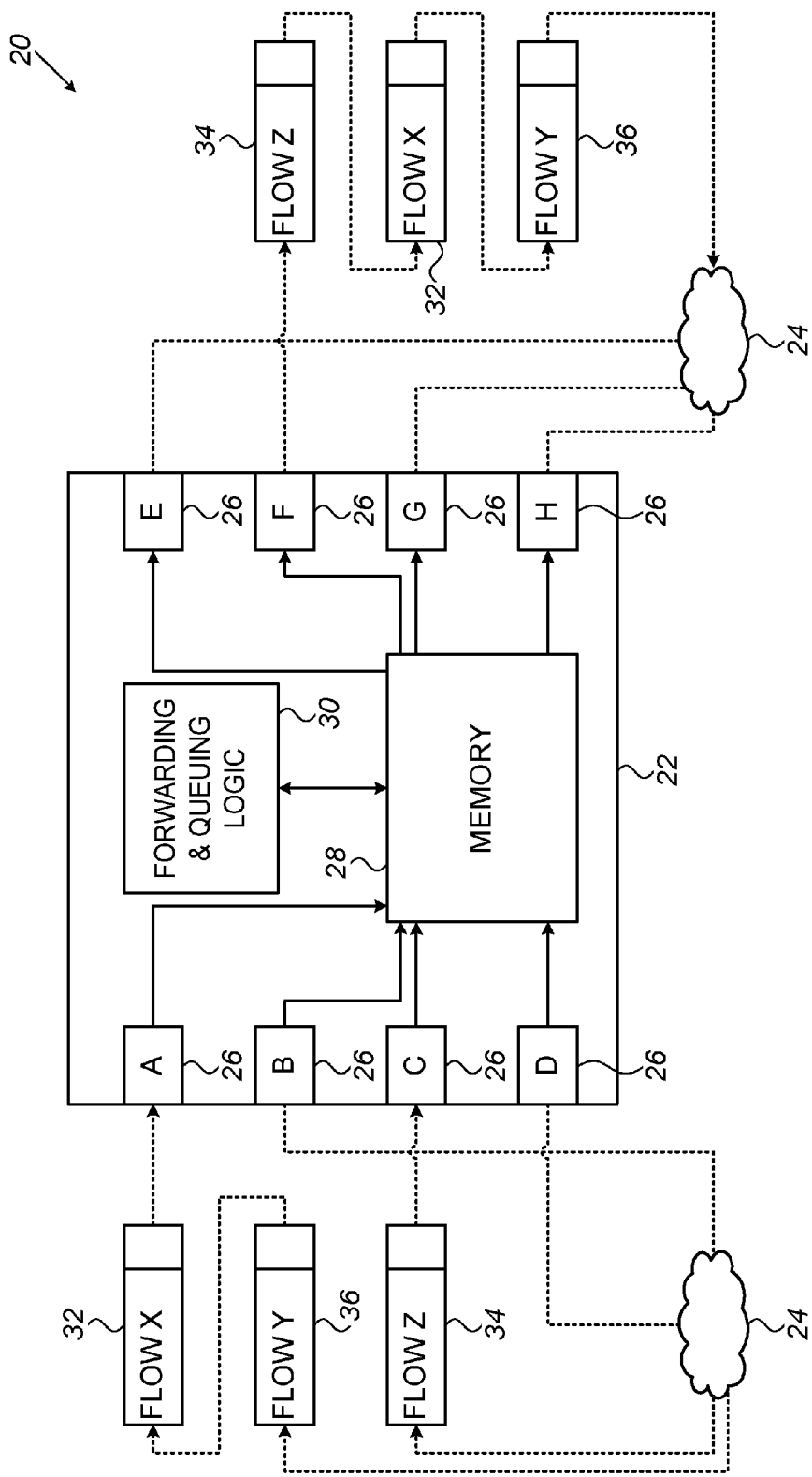
FIG. 1 is a block diagram that schematically illustrates a network communication system implementing adaptive flow prioritization, in accordance with an embodiment of the invention.

In many packet data networks, a small number of large, persistent flows, such as file transfers and long video streams, account for the majority of network traffic and hence network congestion. The transmission delays and dropped packets caused by this sort of congestion can have a serious deleterious effect on many of the smaller flows that are transmitted through the network at the same time. (As a general, empirical rule, smaller flows are more sensitive to delays and dropped packets than larger flows.) Although a number of adaptive flow prioritization techniques have been proposed as possible solutions to these problems, these techniques require the switching element to maintain large numbers of queues, along with complex hardware and/or software for implementation.

Embodiments of the present invention that are described herein provide a simple but effective solution that supports adaptive prioritization of small flows without requiring large numbers of flow queues and complex decision logic. Instead, each flow is classified as "old" or "new," depending upon whether or not packets belonging to the particular flow are queued for transmission through a given egress interface at a given time. Packets belonging to the new flows are then transmitted with higher priority than those in the old flows. In other words, packets in the "new" flows are placed in one queue having high priority, while those in the "old" flows are placed in another queue with low priority.

The disclosed embodiments are typically implemented in a switching element, which comprises multiple interfaces configured to serve as ingress and egress interfaces to a packet data network. Control circuitry in the switching element receives packets belonging to multiple flows and forwards the packets to respective egress interfaces for transmission to the network. For each egress interface, the control circuitry queues the packets that have been forwarded for transmission through that interface in a transmit queue. Multiple different flows are typically forwarded to each egress interface, and thus the transmit queue typically contains packets belonging to multiple flows. In some cases, the packets belong to multiple different traffic classes, which have different, respective levels of quality of service (QoS). In such cases, the flows are assigned to multiple different transmit queues according to the traffic classes, in which case the prioritization techniques described herein are applied separately to each of the transmit queues (or to a certain subset of the transmit queues), thus prioritizing the small flows in each of the corresponding traffic classes.

In order to prioritize the flows that have been forwarded to a given egress interface (within a given traffic class), the control circuitry assesses the respective number of packets belonging to each flow that are queued for transmission through the egress interface at a given time. The flows for which the respective number is zero—meaning that no packets are waiting in the queue—are assigned to the "new flow" group, while the flows for which the respective number is non-zero are assigned to the "old flow" group. After grouping the flows in this manner, the control circuit goes on to transmit the packets in the new flow group that are forwarded to the given egress interface with higher priority than the flows in the old flow group.

In other words, prioritization is based on a simple binary criterion, which effectively creates exactly two transmit queues, one for new flows and the other for old. The group assignment for each flow can be based on a counter, which is incremented when a packet is received in the queue and decremented when it is transmitted to the network. The new flows are typically transmitted with strict priority over the old flows. Within each of the flow groups, however, the packets are simply transmitted in the order in which they were received and queued for transmission through the egress interface.

The procedure described above for assigning flows to the new and old groups is carried out repeatedly in each of a succession of arbitration cycles. Thus, the number of queued packets in each flow is continually reassessed, and a "new" flow may consequently be reassigned to the "old" group if it now has a non-zero number of packets in the queue. By the same token, when an "old" flow has no packets to transmit, it will be reassigned to the "new" group. Each new arbitration cycle is initiated in response to an arbitration event, such as after a certain predefined number of queued packets have been selected for transmission and/or upon expiration of a predefined time period. (To avoid queue starvation, "old" flows are moved to the "new" group only after one (or both) of these events has actually occurred.)

FIG. 1 is a block diagram that schematically illustrates a network communication system 20 implementing adaptive flow prioritization, in accordance with an embodiment of the invention. The operation of system 20 is illustrated by a switch 22, which has multiple interfaces, in the form of ports 26, connected to a packet data network 24, such as an Ethernet or InfiniBand switch fabric. Ports 26, which are labeled with letters A-H for clarity in the description that follows, are configured to serve as ingress and egress ports (or equivalently, ingress and egress interfaces) to network 24. Although for the sake of illustration, ports 26A-D serve in FIG. 1 as ingress ports, while ports 26E-H serve as egress ports, in practice all ports 26 are typically configured for bidirectional operation, as both ingress and egress ports.

Ports 26 receive packets from network 24 belonging to multiple flows, for forwarding to respective egress interfaces for transmission to the network. For example, in the pictured embodiment, port 26A receives a packet 32, belonging to "flow X," followed by a packet 36, belonging to "flow Y." Port 26C meanwhile receives a packet 34, belonging to "flow Z." Assuming network 24 to be an Internet Protocol (IP) network, packet flows can be identified by the packet 5-tuple (source and destination IP addresses and ports, along with the transport protocol). Alternatively, any other suitable flow identifier may be used.

Switch 22 comprises control circuitry, in the form of forwarding and queuing logic 30, which forwards incoming packets 32, 34, 36, ..., to the appropriate egress ports 26 for transmission to network 24. In the pictured example, flows X, Y and Z are all forwarded to the same egress port 26F. Logic 30 queues the packets that are destined for each egress port in transmit queues in a memory 28, while the packets await their turn for transmission. Logic 30 does not necessarily transmit the packets through a given egress port in their order of arrival, however, but rather gives higher priority to "new flows," as explained above. Thus, in the pictured example, flow Y is treated as a new flow, and packet 36 is therefore transmitted through port 26F to network 24 ahead of packets 32 and 34. The operation of this adaptive prioritization mechanism is described further hereinbelow with reference to FIG. 2.

The configurations of switch 22 and network 24 that are shown in FIG. 1 are example configurations, which are chosen purely for the sake of conceptual clarity. In alternative embodiments, any other suitable network and/or switch configuration can be used. Logic 30 in switch 22 typically comprises hard-wired or programmable logic circuits, such as one or more Application-Specific Integrated Circuits (ASICs) or Field-Programmable Gate Arrays (FPGAs). Alternatively or additionally, at least some of the functions of logic 30 may be implemented in software or firmware running on a programmable processor.

Figure 2:
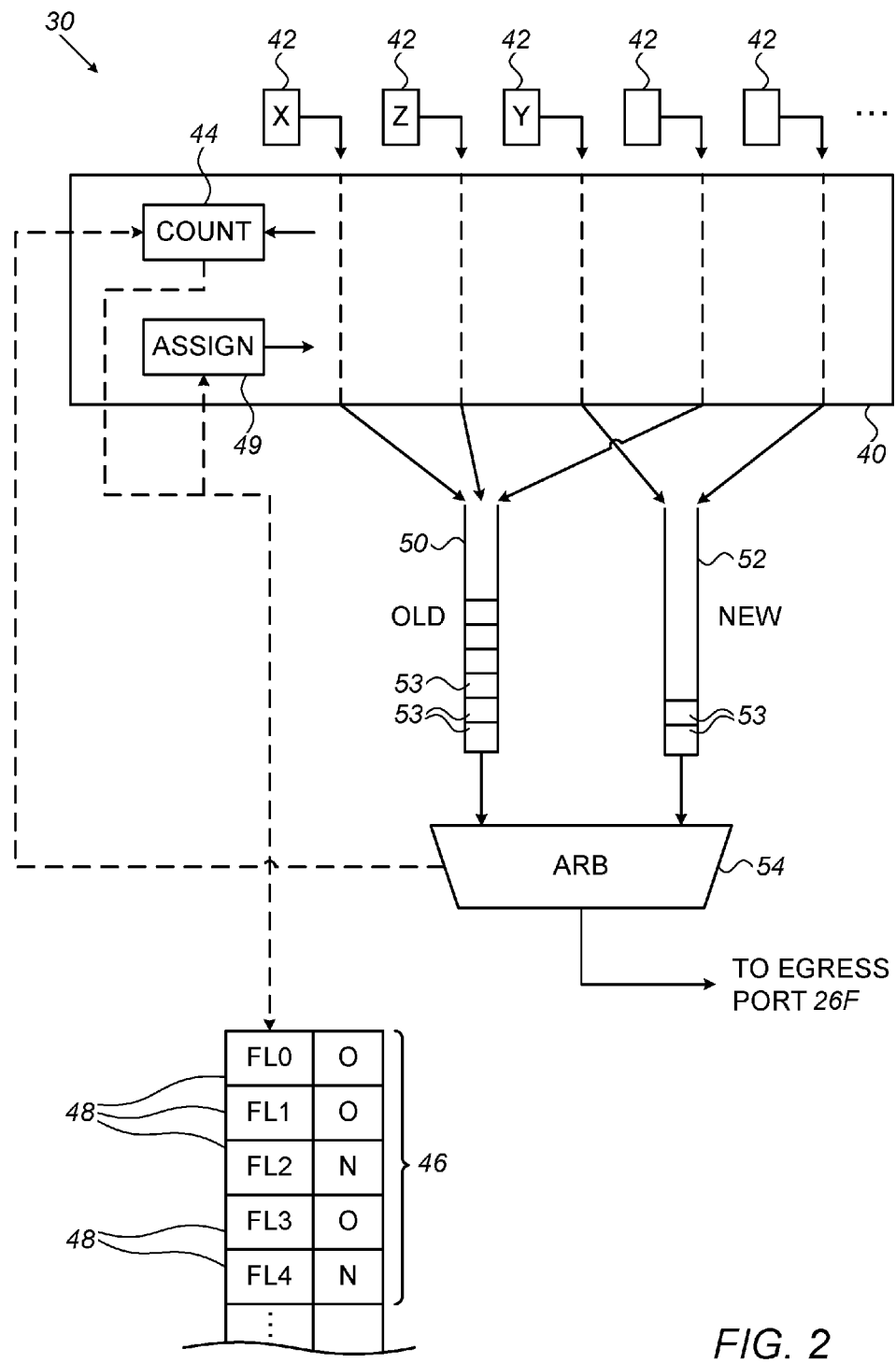
FIG. 2 is a block diagram that schematically illustrates a method for adaptive flow prioritization, in accordance with an embodiment of the invention.

FIG. 2 is a block diagram that schematically illustrates a method for adaptive flow prioritization carried out by forwarding and queuing logic 30 in switch 22, in accordance with an embodiment of the invention. Logic 30 comprises prioritization circuitry 40, which tracks and queues packets in multiple flows 42 that are to be forwarded to a given egress port, such as port 26F in the present example.

Circuitry 40 comprises a counter 44, which counts the number of packets (or, alternatively, the number of bytes) in each of flows 42 that are queued for transmission through port 26F. The counts may be stored in a state table 46, in which each entry 48 corresponds to a different flow. Entries 48 can be keyed for example, by taking a hash over the packet 5-tuple (or over another set of fields in the packet header), with a hash function that is large enough so that the probability of hash collisions is very small. Typically, in each entry, the count is initially set to zero. Counter 44 increments the respective count for a given flow when a packet in the flow is queued for transmission and decrements the count when the packet is transmitted to the network.

Based on the count values in table 46 at a given point in time, an assignment circuit 49 assigns each flow 42 to either an "old flow" group or to a "new flow" group. Specifically, circuit 49 assigns the flows for which the respective entry 48 in table 46 contains a count value of zero—meaning that there are no packets in this flow that are currently queued for transmission—to the new flow group. The flows for which the respective count value is non-zero are assigned to the old flow group. Following these assignments, packets arriving in the old flow group (such as those in flows X and Z) are queued, in order of arrival, in an old flow queue 50, while those in the new flow group (such as those in flow Y) are queued in order of arrival in a new flow queue 52. Entries 53 in queues 50 and 52 may comprise, for example, descriptors that point to the locations of corresponding packets awaiting transmission in memory 28.

Additionally or alternatively, circuitry 40 may make an assessment of the transmission rate and/or the occurrence of transmission bursts (referred to as "burstiness") in at least some of flows 42, and may then apply this assessment in assigning the flows to queue 50 or queue 52.

An arbiter 54 selects entries 53 from queues 50 and 52 and transmits the corresponding packets to network 24 via egress port 26F. Arbiter 54 assigns higher priority to queue 52 (the new flows) than to queue 50 (the old flows). Consequently, packets belonging to small, short-lived flows will generally be forwarded ahead of those in large, persistent flows. Arbiter 54 typically applies a strict priority scheme, in which all packets waiting in queue 52 are transmitted before servicing queue 50.

The assignments of flows to the old and new flow groups, with their corresponding queues 50 and 52, is generally not static, but is rather updated in each of a succession of arbitration cycles. Assignment circuit 49 initiates each new arbitration cycle in response to a certain arbitration event or set of events. (Flows can be transferred from new flow queue 52 to old flow queue 50 at any time, but as noted earlier, transfer from old flow queue 50 to new flow queue 52 can occur only after a specified arbitration event has occurred.) One such arbitration event, for example, could be expiration of a timer, which determines the maximum lifetime of a given set of flow group assignments. Alternatively or additionally, arbitration events may be triggered by arbiter 54, for example in response to having transmitted a certain number of packets or a certain volume of data. Further additionally or alternatively, after a given flow in the new flow group has contributed a certain number of packets to queue 52, assignment circuit 49 may immediately transfer the flow to the old flow group and queue 50.

Although FIG. 2 shows only a single pair of old and new flow queues 50, 52 feeding arbiter 54, in some embodiments, switch 22 receives and forwards packets belonging to multiple different traffic classes, which have different, respective levels of quality of service (QoS). In this case, prioritization circuitry 40 assigns flows 42 to different queues not only according to whether they are "old" or "new," but also according to the traffic classes. The methods of adaptive flow prioritization that are described herein may then be applied separately to one or more of the traffic classes, or to all of the traffic classes. Thus, logic 30 may maintain separate pairs of old and new queues for each traffic class to which adaptive flow prioritization is to be applied. Arbiter 54 arbitrates separately among the old and new flows in each of these different traffic classes.

In some embodiments of the present invention, the separation of flows 42 into old and new groups can also be used in applying congestion avoidance protocols, such as dropping and/or marking of packets in case of congestion. Specifically, when switch 22 receives an indication of congestion in network 24, logic 30 may apply the specified congestion avoidance protocol to the flows in the old flow group but not to the flows in the new flow group. This approach is advantageous in that it applies congestion control specifically to the larger, more persistent flows that are generally responsible for the congestion, while minimizing the effect of the congestion avoidance measures on the more sensitive, smaller flows. Furthermore, the count values in table 46 can be used in making congestion control decisions, thus enabling logic 30 to apply congestion avoidance measures selectively to the larger flows, based on the respective numbers of the packets that they have queued for transmission.

Although the embodiments described above relate specifically, for the sake of clarity and completeness, to network switches, the principles of the present invention may similarly be applied to network switching elements of other sorts, such as bridges and routers, as well as to other sorts of network elements having multiple inputs and outputs, such as suitable types of network interface controllers. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   receiving from a packet data network, via ingress interfaces of a switching element, packets belonging to multiple flows, and forwarding the packets to respective egress interfaces of the switching element for transmission to the network;
   for each egress interface of the switching element, queuing the packets, belonging to a plurality of the flows, that have been forwarded for transmission through the egress interface; and
   for each of one or more of the egress interfaces, in each of a succession of arbitration cycles:
   assessing a respective number of the packets in each of the plurality of the flows that are queued for transmission through the egress interface;
   assigning the flows for which the respective number is zero to a first group, while assigning the flows for which the respective number is non-zero to a second group; and
   after assigning the flows, transmitting to the network the received packets that have been forwarded to the egress interface and belong to the flows in the first group with a higher priority than the flows in the second group.

2. The method according to claim 1, wherein assessing the respective number comprises:
   maintaining a respective counter for each flow among the plurality of the flows;
   incrementing the respective counter when a packet in the flow is queued for transmission; and
   decrementing the counter when the packet is transmitted to the network.

3. The method according to claim 1, and comprising initiating a new arbitration cycle in the succession in response to an arbitration event,
   wherein assessing the respective number comprises reassessing the respective number of the packets in each of the plurality of the flows that are queued for transmission upon initiation of the new arbitration cycle, and
   wherein assigning the flows comprises reassigning the flows to the first and second groups based on the reassessed number.

4. The method according to claim 3, wherein the arbitration event is selected from a group of arbitration events consisting of selection of a predefined number of the queued packets for transmission and expiration of a predefined time period.

5. The method according to claim 1, wherein transmitting the packets comprises transmitting the packets that belong to the flows in the first group with a strict priority over the flows in the second group.

6. The method according to claim 1, wherein transmitting the packets comprises transmitting the packets within each of the first and second groups in an order in which the packets have been queued for transmission.

7. The method according to claim 1, wherein the packets belong to multiple different traffic classes, which have different, respective levels of quality of service (QoS), and wherein queuing the packets comprises assigning the flows to different queues according to the traffic classes, and wherein transmitting the packets comprises arbitrating separately among the flows in each of one or more of the different traffic classes.

8. The method according to claim 1, and comprising receiving in the switching element an indication of congestion in the network, and in response to the indication, applying a congestion control protocol to the flows in the second group but not to the flows in the first group.

9. The method according to claim 8, wherein applying the congestion control protocol comprises selecting the flows to which congestion control measures are to be applied responsively to the respective number of the packets in each of the flows in the second group that are queued for transmission.

10. The method according to claim 1, and comprising making an assessment of at least one of a transmission rate and an occurrence of transmission bursts in at least some of the flows, and applying the assessment in assigning the flows to the first and second groups.

11. Communication apparatus, comprising:
    multiple interfaces configured to serve as ingress and egress interfaces to a packet data network and to receive packets belonging to multiple flows for forwarding to respective egress interfaces for transmission to the network; and
    control circuitry, which is configured to queue the packets, belonging to a plurality of the flows, for transmission through each egress interface, and for each of one or more of the egress interfaces, in each of a succession of arbitration cycles:
    to assess a respective number of the packets in each of the plurality of the flows that are queued for transmission through the egress interface;
    to assign the flows for which the respective number is zero to a first group, while assigning the flows for which the respective number is non-zero to a second group; and
    after assigning the flows, to transmit to the network the packets that have been forwarded to the egress interface and belong to the flows in the first group with a higher priority than the flows in the second group.

12. The apparatus according to claim 11, wherein the control circuitry is configured to assess the respective number of the packets in each of the plurality of the flows that are queued for transmission by maintaining a respective counter for each flow among the plurality of the flows, incrementing the respective counter when a packet in the flow is queued for transmission, and decrementing the counter when the packet is transmitted to the network.

13. The apparatus according to claim 11, wherein the control circuitry is configured to initiate a new arbitration cycle in the succession in response to an arbitration event, to reassess the respective number of the packets in each of the plurality of the flows that are queued for transmission upon initiation of the new arbitration cycle, and to reassign the flows to the first and second groups based on the reassessed number.

14. The apparatus according to claim 13, wherein the arbitration event is selected from a group of arbitration events consisting of selection of a predefined number of the queued packets for transmission and expiration of a predefined time period.

15. The apparatus according to claim 11, wherein the control circuitry is configured to transmit the packets that belong to the flows in the first group with a strict priority over the flows in the second group.

16. The apparatus according to claim 11, wherein the control circuitry is configured to transmit the packets within each of the first and second groups in an order in which the packets have been queued for transmission.

17. The apparatus according to claim 11, wherein the packets belong to multiple different traffic classes, which have different, respective levels of quality of service (QoS), and wherein the control circuitry is configured to assign the flows to different queues according to the traffic classes, and to arbitrate separately among the flows in each of one or more of the different traffic classes.

18. The apparatus according to claim 11, wherein the control circuitry is configured, upon receiving in the switching element an indication of congestion in the network, to apply a congestion avoidance protocol to the flows in the second group but not to the flows in the first group.

19. The apparatus according to claim 18, wherein the control circuitry is configured to select the flows to which congestion control measures are to be applied responsively to the respective number of the packets in each of the flows in the second group that are queued for transmission.

20. The apparatus according to claim 11, wherein the control circuitry is configured to make an assessment of at least one of a transmission rate and an occurrence of transmission bursts in at least some of the flows, and to apply the assessment in assigning the flows to the first and second groups.

* * * * *